United States Patent
Chen

(10) Patent No.: US 10,621,740 B2
(45) Date of Patent: Apr. 14, 2020

(54) 3D MODELING METHOD BASED ON POINT CLOUD DATA

(71) Applicants: XYZPRINTING, INC., New Taipei (TW); KINPO ELECTRONICS, INC., New Taipei (TW)

(72) Inventor: Wei-Ting Chen, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 263 days.

(21) Appl. No.: 15/867,701

(22) Filed: Jan. 11, 2018

(65) Prior Publication Data
US 2019/0122377 A1 Apr. 25, 2019

(30) Foreign Application Priority Data
Oct. 24, 2017 (CN) .......................... 2017 1 1000498

(51) Int. Cl.
*G06T 7/50* (2017.01)
*G06T 15/20* (2011.01)
(Continued)

(52) U.S. Cl.
CPC ............... *G06T 7/50* (2017.01); *B33Y 50/00* (2014.12); *G06T 7/55* (2017.01); *G06T 7/60* (2013.01);
(Continued)

(58) Field of Classification Search
None
See application file for complete search history.

(56) References Cited

U.S. PATENT DOCUMENTS

2012/0056887 A1* 3/2012 Kim ....................... G06T 7/529
345/426
2012/0306876 A1 12/2012 Shotton et al.
(Continued)

FOREIGN PATENT DOCUMENTS

DE 102015210453 B3 10/2016
WO 2012126135 A1 9/2012
(Continued)

OTHER PUBLICATIONS

Search Report dated Jun. 6, 2018 of the corresponding European patent application.

*Primary Examiner* — Mark Roz
(74) *Attorney, Agent, or Firm* — Chun-Ming Shih; HDLS IPR Services

(57) ABSTRACT

A 3D modeling method based on point cloud data for generating 3D object data corresponding to target object (50, 51) includes activating a 3D scanner (2) to obtain 2D images of the target object (50, 51) from different angles and a plurality of depths of the target object (50, 51); generating a plurality of point cloud data (60-64) based on the 2D images and the depths; performing a pre-modeling process on the plural point cloud data (60-64) to filter the plural point data (70-79) not belonging to the target object (50, 51) out of each point cloud data (60-64); and performing a 3D modeling process on the filtered point cloud data (60-64) to generate the 3D object data. The 3D object data generated by the present disclosed example via execution of the pre-modeling process has minimum noise and is appropriate for 3D print.

10 Claims, 11 Drawing Sheets

(51) Int. Cl.
  *B33Y 50/00*   (2015.01)
  *G06T 7/60*    (2017.01)
  *G06T 7/55*    (2017.01)
  *G06T 17/00*   (2006.01)

(52) U.S. Cl.
  CPC ............ *G06T 15/205* (2013.01); *G06T 17/00* (2013.01); *G06T 2200/08* (2013.01); *G06T 2207/10028* (2013.01); *G06T 2210/56* (2013.01)

(56) References Cited

U.S. PATENT DOCUMENTS

| | | | |
|---|---|---|---|
| 2016/0071318 A1* | 3/2016 | Lee | G06T 17/00 345/419 |
| 2016/0150217 A1 | 5/2016 | Popov | |
| 2016/0210737 A1 | 7/2016 | Straub et al. | |

FOREIGN PATENT DOCUMENTS

| | | |
|---|---|---|
| WO | 2015148824 A1 | 10/2015 |
| WO | 2016073108 A1 | 5/2016 |

\* cited by examiner

3D MODELING METHOD BASED ON POINT CLOUD DATA

BACKGROUND OF THE INVENTION

1. Technical Field

The technical field relates to 3D (three-dimensional) modeling methods, and more particularly relates to a 3D modeling method based on point cloud data.

2. Description of Related Art

Regarding 3D modeling of the related art, a skilled draftsman may use 3D graphic software to draw a 3D object and generate corresponding 3D object data. Above manual 3D modeling is done by using 3D graphic software. Thus, an unskilled user cannot generate 3D object data and this problem is a bottleneck for popularizing 3D printing.

For solving above problem, there is a commercially available 3D scanner. The 3D scanner can scan an object from one of different angles and measure depth of the object as well as generate 3D scanning data of different angles. Next, a user may use modeling software to perform a 3D modeling on the 3D scanning data of different angle in order to generate 3D object data corresponding to a target object.

However, the 3D scanner of the related art has the following drawbacks. Objects surrounding the target object (e.g., platform for supporting the target object, background, or other objects on the same platform) may be scanned in the scanning process. Thus, generated 3D scanning data may contain much noise, i.e., data not belonging to the target object. 3D object data is generated after the 3D scanning data containing noise is processed by 3D modeling. The 3D object data comprises other 3D object data not belonging to the target object (e.g., 3D object data of the desk) and cannot be used for 3D printing.

Thus, the need for an improved 3D modeling method for solving above problems exists.

SUMMARY OF THE INVENTION

The present disclosed example is directed to provide a 3D modeling method based on point cloud data capable of filtering some data not belonging to an object out of scanned data in pre-modeling process.

In one of the exemplary embodiments, a 3D modeling method based on point cloud data for generating 3D object data corresponding to a target object, comprising (a) activating a 3D scanner to obtain 2D images of the target object from different angles and a plurality of depths of the target object, each depth corresponding to a plurality of pixels of the 2D images; (b) generating a plurality of point cloud data based on the 2D images and the depths, each of the point cloud data including a plurality of point data; (c) performing a pre-modeling process on the plural point cloud data to filter the plural point data not belonging to the target object out of each of the point cloud data; and (d) performing a 3D modeling process on the filtered point cloud data to generate the 3D object data.

In one of the exemplary embodiments, step (c) comprises the sub-steps of (c11) setting focus data in each of the point cloud data; (c12) calculating a filter range based on coordinates of the plural point data of each of the point cloud data wherein the coordinates of each of the point data are recorded with a plane location and a depth of each of the point data in the plural point cloud data; and (c13) setting a filter area in each of the point cloud data based on the focus data and the filter range of each of the point cloud data, and filtering out the plural point data externally of the filter area so as to filter both the plural point data belonging to a background and the plural point data belonging to a platform out of each of the point cloud data.

In one of the exemplary embodiments, in sub-step (c11) the plural point data in a center of the plural point cloud data are set as the focus data.

In one of the exemplary embodiments, in sub-step (c11) an average of the coordinates of the plural point data at a central area of the plural point cloud data is calculated to obtain coordinates of the focus data.

In one of the exemplary embodiments, in sub-step (c12) a standard deviation between the coordinates of the plural point data of each of the point cloud data is calculated, and the filter range is set based on the standard deviation.

In one of the exemplary embodiments, step (c) comprises the sub-steps of (c21) selecting at least three point data from each of the point cloud data; (c22) determining a regression plane based on the selected at least three point data; (c23) counting the number of the plural point data belonging to the regression plane in the plural point cloud data to obtain the number of the plural point data in an inlier; and (c24) after determining the number of the plural point data of the inlier is greater than a critical value of the inlier, filtering out the plural point data belonging to the regression plane in the plural point cloud data so as to filter the plural point data belonging to the platform out of each of the point cloud data.

In one of the exemplary embodiments, sub-step (c24) comprises the sub-steps of (c241) setting the regression plane as one of a plurality of candidate planes when the number of the plural point data of the inlier is greater than the critical value of the inlier; (c242) repeatedly performing steps (c21), (c22), (c23) and (c241) until an ending condition is met; (c243) selecting one of the candidate planes and filtering the plural point data belonging to the selected candidate plane out of each of the point cloud data.

In one of the exemplary embodiments, in sub-step (c242) the ending condition is defined by repeatedly performing steps (c21), (c22), (c23) and (c241) a plurality of times and counting same until the count is equal to a predetermined count or the number of the candidate planes is equal to a predetermined number.

In one of the exemplary embodiments, in sub-step (c23) an extension range is set at a periphery of the regression plane, and the number of the plural point data belonging to the regression plane or the extension range of the regression plane is calculated to obtain the number of the plural point data of the inlier; and wherein in sub-step (c243) a distance between each candidate plane and the plural point data in the extension range of each candidate plane is calculated, a plurality of the distance is calculated as a total distance, one of the candidate planes having a minimum total distance is selected, and the plural point data belonging to the selected candidate plane and the extension range of the selected candidate plane are filtered out of each of the point cloud data.

In one of the exemplary embodiments, in sub-step (c22) a regression function is calculated based on the coordinates of the at least three point data to determine the regression plane formed by the at least three point data, and wherein in sub-step (c23) the plural point data belonging to the regression plane is determined when the coordinates of each of the plural point data are complied with the regression function.

In one of the exemplary embodiments, step (c) comprises the sub-steps of (c31) obtaining a critical depth; and (c32)

filtering the plural point data having a depth not less than the critical depth out of each of the point cloud data so as to filter the plural point data belonging to the background out of each of the point cloud data.

In one of the exemplary embodiments, after step (d) further comprising the steps of (e1) identifying platform object data in the 3D object data corresponding to a platform object; and (e2) deleting the platform object data from the 3D object data.

The present disclosed example has the following advantages and benefits in comparison with the related art: 3D object data generated by the pre-modeling process has minimum noise and is appropriate for 3D print.

The above and other object, features and advantages of the present disclosed example will become apparent from the following detailed description taken with the accompanying drawings.

DETAILED DESCRIPTION OF THE PRESENT DISCLOSED EXAMPLE

Embodiments of the present disclosed example will now be described, by way of example only, with reference to the accompanying drawings.

Figure 1:
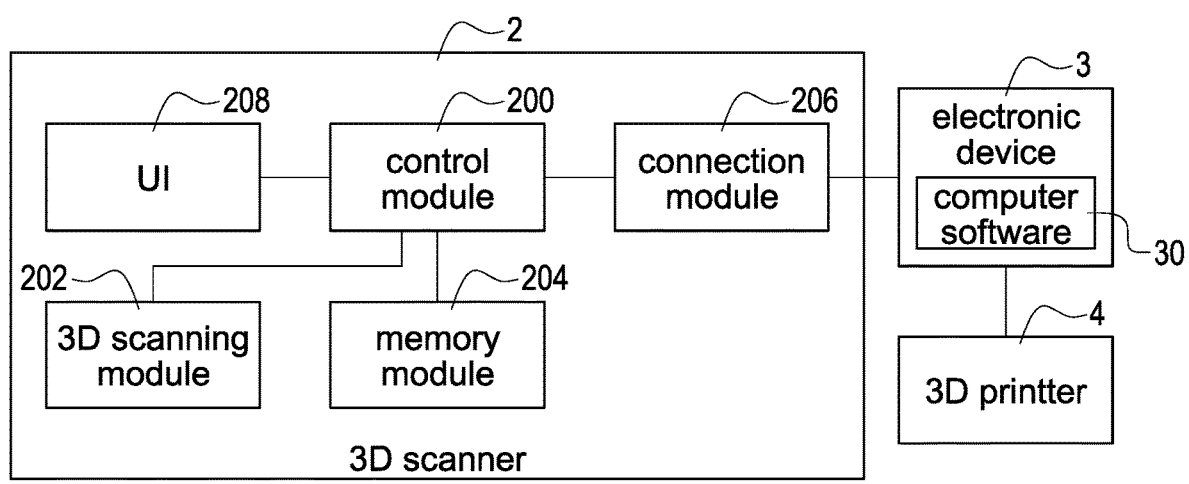
FIG. 1 is a block diagram of a 3D modeling system according to a first embodiment of the present disclosed example.

Referring to FIG. 1, a 3D modeling system 1 according to a first embodiment of the present disclosed example is shown. A 3D modeling method based on point cloud data of the present disclosed example (hereinafter called 3D modeling method) is used in the 3D modeling system 1 which includes a 3D scanner 2 and computer software 30.

In an embodiment, the computer software 30 is stored in a memory (not shown) of an electronic device (e.g., laptop, tablet computer, personal computer or cloud server) 3. The memory is a non-volatile memory. The computer software 30 records computer executable codes. A processor (not shown) of the electronic device 3 executes the computer software 30. Thereafter, the computer software 30 performs steps of the 3D modeling method of the present disclosed example based on 3D scanning data (e.g., point cloud data discussed later) generated by the 3D scanner 3.

The 3D scanner 2 includes a 3D scanning module 202, a memory module 204, a connection module 206, a user interface (UI) 208, and a control module 200 electrically connected to the above modules.

The 3D scanning module 202 includes an image fetching module and a depth meter (e.g., laser distance meter). The image fetching module is used to take a picture of an object from a specific angle and convert same into a 2D image. The depth meter is used to measure depth of each position in the 2D image, i.e., measuring a distance between the depth meter and the real position of each pixel of each 2D image. Next, the 3D scanning module 202 processes each 2D image and a plurality of values of depth corresponding to the 2D image to generate point cloud data. Therefore, the 3D scanning module 202 may generate many point cloud data of different angles by scanning the target object from different angles and measuring depths of the positions in the 2D image.

In an embodiment, the point cloud data is a combination of the 2D image and the depths and includes a plurality of point data each corresponding to a coordinate. The coordinate is, for example, a 3D coordinate which records a location of each point data in the point cloud data in a plane (expressed by X-coordinate and Y-coordinate) and its depth (expressed by Z-coordinate).

The memory module 204 is used to store data. The connection module (e.g., USB module, PCI bus module, Wi-Fi module or Bluetooth® module) 206 is connected to the electronic device 3 and is adapted to send scanned data to the electronic device 3. The UI (e.g., keyboard, keypad, display, buzzer or any combination of above components) 208 is used to receive user input and output alert information. The control module 200 is used to control operations of the 3D scanner 2.

In an embodiment, the memory module 204 is a non-volatile memory and is used to store scanning software (e.g., firmware of the 3D scanning module 202). The scanning software is embedded with computer executable codes. The control module 200 executes the scanning software. Thereafter, the scanning software performs steps of the 3D modeling method based on point cloud data.

The following description is directed to the computer software 30 stored in the electronic device 3 and the scanning software stored in the 3D scanner 2. But the present disclosed example is not limited to such.

In an embodiment, the memory module 204 stores the computer software 30. The control module 200 executes the computer software. Thereafter, the computer software performs steps of the 3D modeling method based on point cloud data of the present disclosed example based on the 3D scanning data generated by the 3D scanning module 202.

In an embodiment, the 3D modeling system 1 further comprises a 3D printer 4. The electronic device 3 may further layer the generated 3D object data to generate 3D printing data which is in turn sent to the 3D printer 4 to print. Next, the 3D printer 4 prints a 3D physical model similar to a target object.

In an embodiment, the 3D scanner 2 and the 3D printer 4 are provided in the same machine (e.g., the 3D scanning printer). A platform of the 3D scanning printer is used as a scanning platform for carrying a target object to be scanned in 3D printing. Specifically, the platform of the 3D scanning printer is the platform used as a shaping platform for carrying a printed 3D physical model.

Figure 2A:
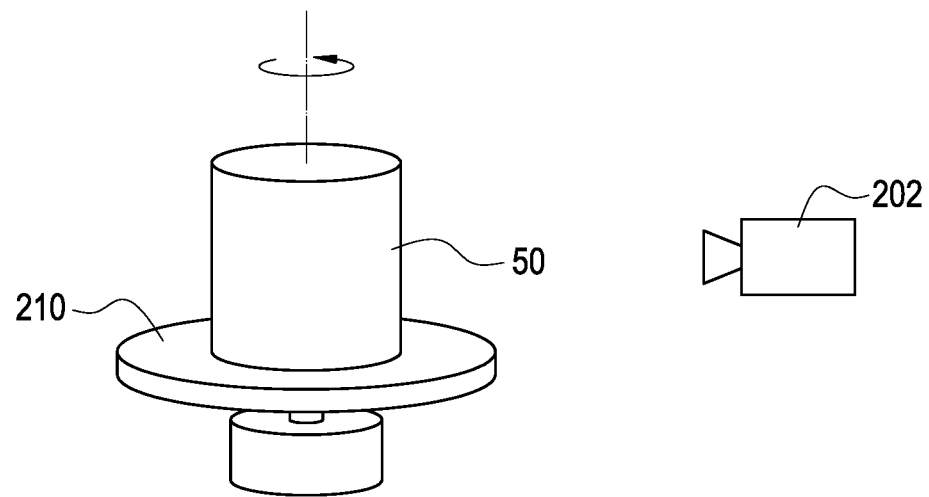
FIG. 2A schematically depicts a 3D modeling system according to a second embodiment of the present disclosed example.
Figure 2B:
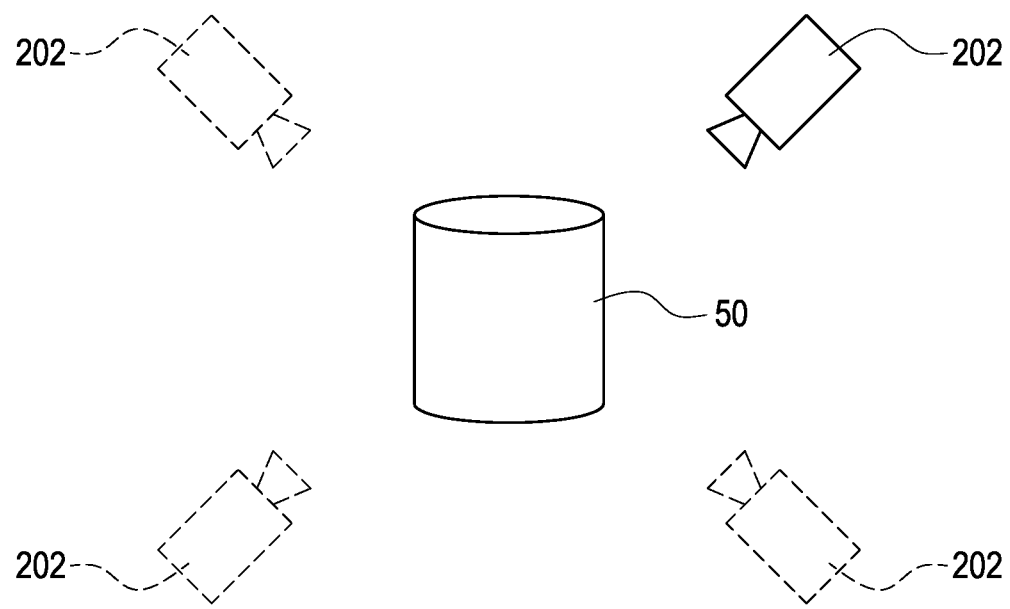
FIG. 2B schematically depicts a 3D modeling system according to a third embodiment of the present disclosed example.

Referring to FIGS. 2A and 2B in which FIG. 2A schematically depicts a 3D modeling system according to a second embodiment of the present disclosed example, FIG. 2B schematically depicts a 3D modeling system according to a third embodiment of the present disclosed example, and both are used to describe how to generate point cloud data from different angles of a target object.

In the example of FIG. 2A, the 3D scanner 2 includes a rotational platform 210 electrically connected to the control module 200. First, a user places a target object on the rotational platform 210. Next, the control module 200 instructs the scanning module 202 to scan the target object from an angle in order to obtain a 2D image and a set of depths. Next, the control module 200 rotates the rotational platform 210 a predetermined angle. Next, the control module 200 instructs the scanning module 202 to scan the target object from another angle in order to obtain another 2D image and another set of depths. By repeating above steps, the control module 200 can obtain 2D images of the target object from different angles and sets of depths of the target object as well as generate point cloud data of different angles.

In the example of FIG. 2B, the 3D scanning module 202 is mobile. For instance, the 3D scanning module 202 is a hand-held 3D scanner or the 3D scanning module 202 is disposed on a mobile device. Thus, the 3D scanning module 202 can be carried to different locations to scan the target object from different angles in order to obtain 2D images of the target object and sets of depths of the target object as well as generate point cloud data of different angles.

Figure 3:
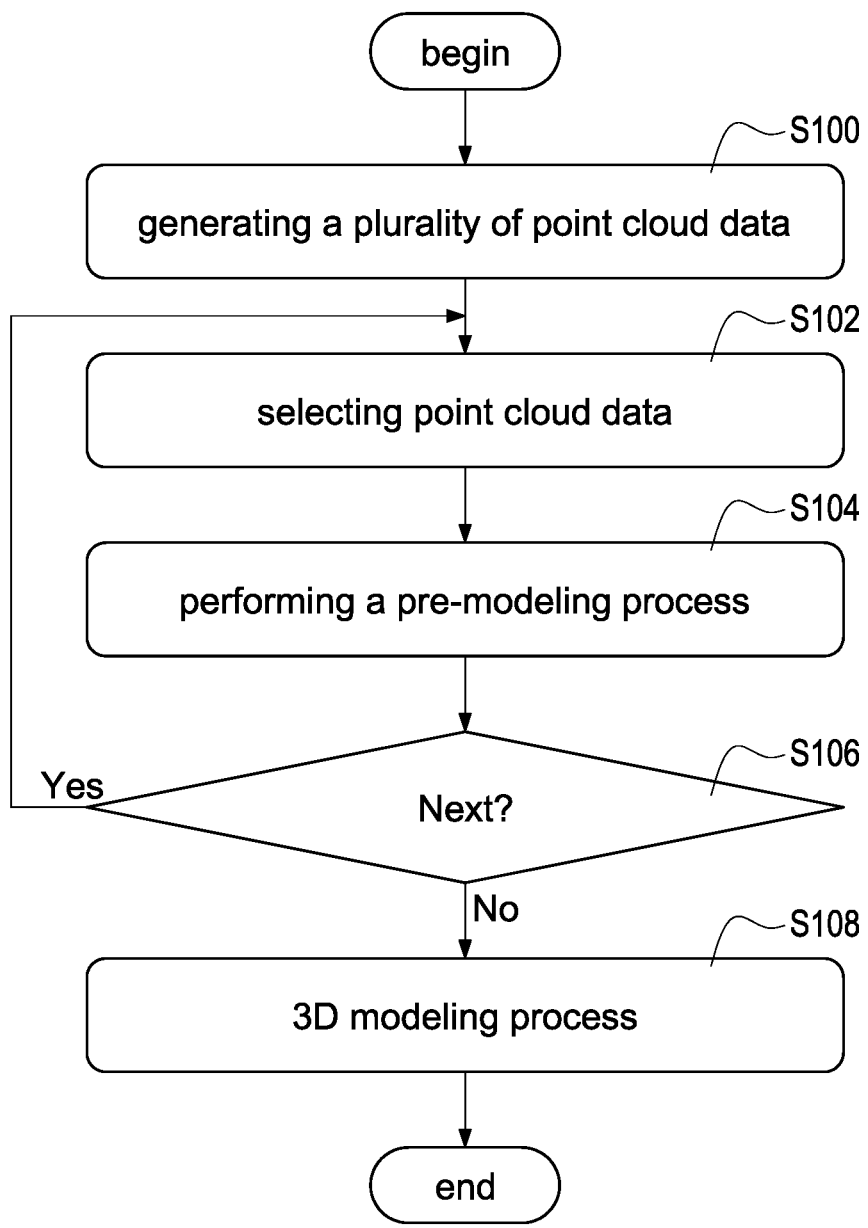
FIG. 3 is a flow chart of a 3D modeling method based on point cloud data according to a first embodiment of the present disclosed example.

Referring to FIG. 3, it is a flow chart of a 3D modeling method based on point cloud data according to a first embodiment of the present disclosed example. Implementation of the 3D modeling method of the present disclosed example is tied to the 3D modeling system 1 shown in FIG. 1, FIG. 2A or FIG. 2B. The 3D modeling method comprises the following steps:

Step S100: A user operates the 3D scanner 2 to repeatedly scan a target object from one of a plurality of different angles. The control module 200 of the 3D scanner 2 instructs the 3D scanning module 202 to obtain 2D images of the target object from different angles and sets of depths of the target object in the scanning process. The depths correspond to pixels of the 2D images respectively. Finally, the control module 200 generates point cloud data of different angles corresponding to different angles of the target object based on the 2D images of the target object and sets of depths of the target object. Next, the control module 200 sends the point cloud data to the electronic device 3 to process the 3D modeling.

In an embodiment, the point cloud data include a plurality of point data each corresponding to one of a plurality of pixels of the 2D image.

In an embodiment, the memory module 204 includes a releasable data storage device (e.g., external hard disk drive or memory card) and the control module 200 can store point cloud data in the releasable data storage device. Next, the user may detach the releasable data storage device from the 3D scanner 2 and connect the releasable data storage device to the electronic device 3. Thus, the electronic device 3 may read the point cloud data.

Step S102: The electronic device 3 executes the computer software 3 to select one of a plurality of point cloud data (e.g., a first point cloud data).

Step S104: The electronic device 3 performs a pre-modeling process on the selected point cloud data to filter out some point data not belonging to the target object.

In an embodiment, the electronic device 3 identifies noise point data from the point cloud data such as background point data, platform point data and point data of object external to the target object. Further, the electronic device 3 filters identified noise point data out of the point cloud data.

Figure 8:
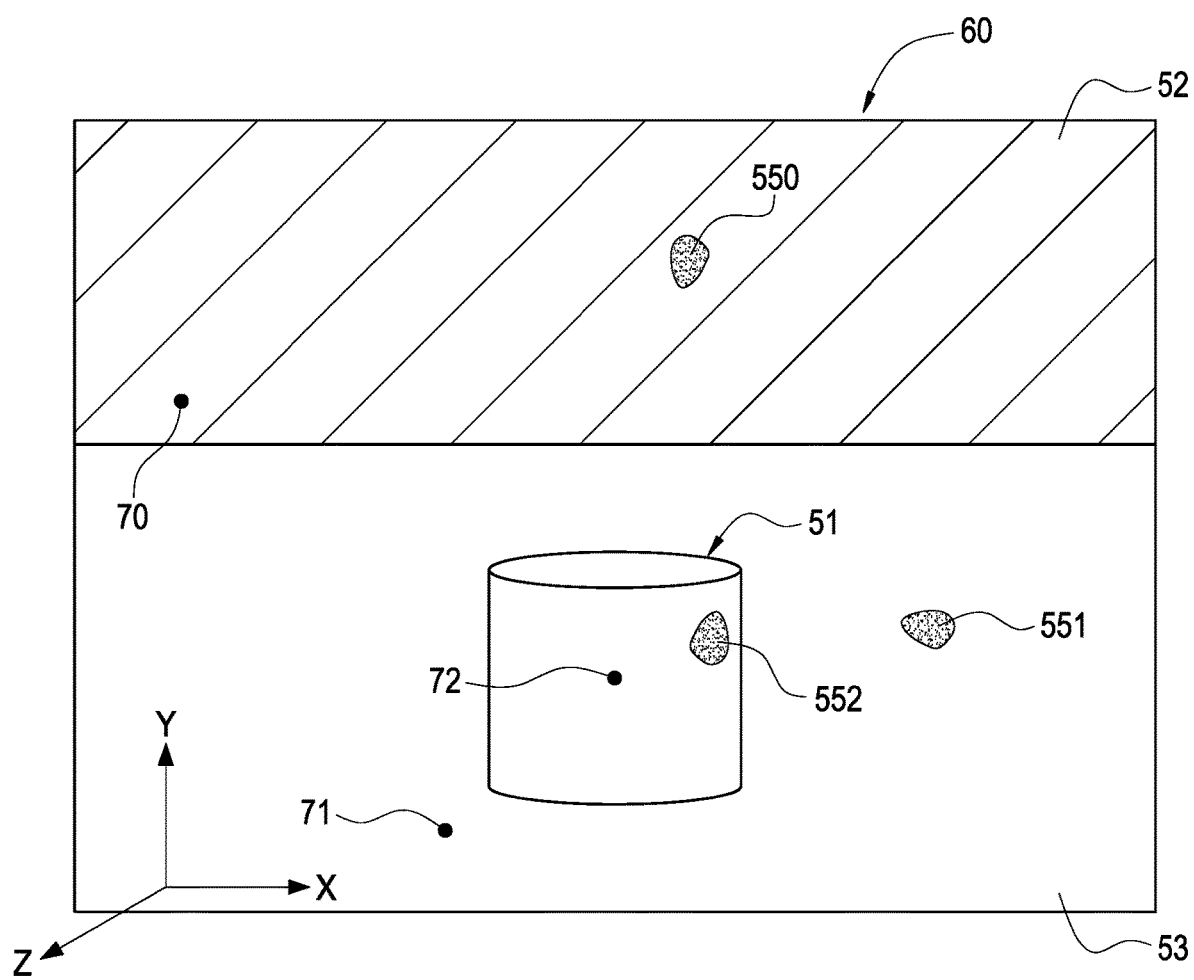
FIG. 8 schematically depicts point cloud data of the present disclosed example in a first configuration of the present disclosed example.

Referring to FIG. 8, it schematically depicts point cloud data of the present disclosed example in a first configuration of the present disclosed example. As shown, point cloud data 60 consists of a target object 51, a background 52 and a platform 53. Thus, in the point cloud data 60 some point data (e.g., point data 72 in the example) belonging to the target object 51, some point data (e.g., point data 70 in the example) belonging to the background 52, and some point data (e.g., point data 71 in the example) belonging to the platform 53.

It is noted that the 3D scanning module 202 cannot measure depths of all locations in the image due to too deep background, reflection from an object, or environment interference in the 3D scanning process. Thus, some point data of the point cloud data 60 does not have depths, i.e., ineffective point data 550-552. The ineffective point data 550-552 cannot be used for 3D modeling due to no depths.

In the pre-modeling process of the present disclosed example, it is possible of further filtering the ineffective point data 550-552 out of the point cloud data 60 in order to greatly decrease data to be processed and thus prevent 3D modeling from being distorted.

Referring to FIG. 3 again, step S106 is performed in which the electronic device 3 determines whether all point cloud data have been pre-modeled or not. If yes (i.e., all point cloud data have been pre-modeled), the method (or the electronic device 3) goes to step S108. Otherwise, the method loops back to step S102 and the electronic device 3 performs steps S102 to S104 again in which another point cloud data (e.g., a second point cloud data) is selected and the pre-modeling process is performed again.

Step S108: The electronic device 3 performs a 3D modeling process on filtered point cloud data to generate 3D object data corresponding to the target object. 3D modeling is known in the art and thus a detailed description thereof is omitted herein for the sake of brevity.

It is noted that the 3D scanner 2 may scan the target object and the surrounding environment (e.g., background, platform for supporting the target object or objects on the platform) at the same time in the scanning process. Thus, some point data of the point cloud data is not related to the target object and in turn it may distort subsequent 3D modeling processes. Advantageously, the present disclosed example can decrease noise and generate high quality 3D object data by filtering out point data not belonging to the target object in the 3D pre-modeling process.

Figure 4:
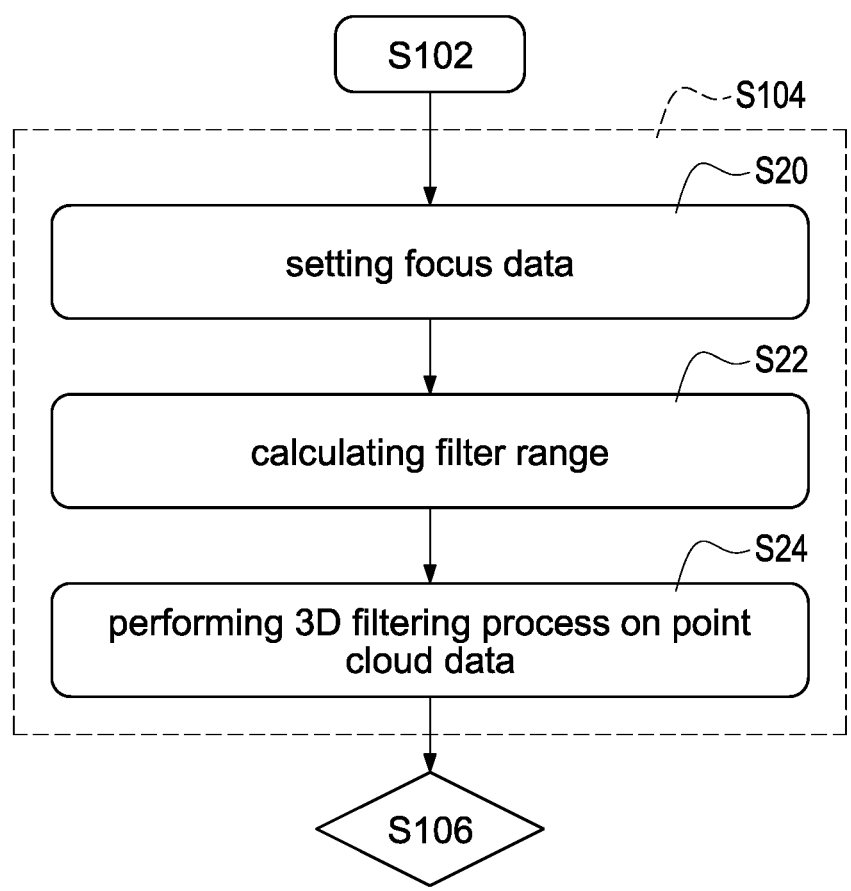
FIG. 4 is a flow chart illustrating details of step S104 according to a second embodiment of the 3D modeling method.

Referring to FIGS. 3 and 4 in which FIG. 4 is a flow chart illustrating details of step S104 according to a second embodiment of the 3D modeling method. In the embodiment, the pre-modeling process is a 3D filtering process which is adapted to cut the point cloud data for filtering out point data not belonging to the target object. In comparison with the 3D modeling method of FIG. 3, the step S104 according to the embodiment of the 3D modeling method comprises the following steps:

Step S20: The electronic device 3 sets focus data in the selected point cloud data. In an embodiment, the electronic device 3 selects one of a plurality of point data of the point cloud data and sets the selected point data as the focus data. Specifically, the electronic device 3 selects point data at a center of the point cloud data as the focus data.

In an embodiment, the electronic device 3 calculates an average of coordinates of a plurality of point data at a central area of the point cloud data to obtain coordinates of the focus data.

For example, the central area is 5×5 and is the center of the point cloud data. The electronic device 3 performs a weighted average calculation on the 25 point data by using a Gauss filter of a following formula 1 in order to obtain coordinates of the focus data and set the point data.

$$d_f = \frac{1}{278}\begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix} \times d_c \quad \text{(formula 1)}$$

where $d_f$ is coordinates of focus data and $d_c$ is coordinates of point data at the center of the point cloud data.

It is noted that the central area is 5×5 in the embodiment and a Gauss filter is used to perform an average calculation, the present disclosed example is not limited to such. Those skilled in the art will recognize that the present disclosed example can be practiced by changing the central area and coefficients for calculating average within the spirit and scope of the appended claims. Thus, the present disclosed example still can set focus data even when the point data at the center of the point cloud data is ineffective point data.

Step S22: The electronic device 3 calculates a filter range based on coordinates of the plurality of point data of the point cloud data.

In an embodiment, the electronic device 3 calculates average coordinates of all or some point data of the point cloud data (e.g., all or some effective point data) based on the following formula 2; next calculates a standard deviation between coordinates of the plurality of point data of the point cloud data based on the calculated average coordinates and the following formula 3; and finally, the electronic device 3 sets a filter range based on the calculated standard deviation. For example, the standard deviation is set as radius or length of the filter range.

$$\bar{d} = \frac{1}{n}\sum_{i=2}^{n} d_i \quad \text{(formula 2)}$$

where $\bar{d}=(\bar{x},\bar{y},\bar{z})$ is average coordinates; $d_i=(x_i, y_i, z_i)$ is coordinates of point data; and n is the number of effective data.

$$SD = \sqrt{\frac{1}{n}\sum_{i=2}^{n}(d_i - \bar{d})^2} \quad \text{(formula 3)}$$

where $SD=(x_{sd}, y_{sd}, z_{sd})$ is standard deviation.

Step S24: The electronic device 3 sets a filter area in the point cloud data based on the focus data and the filter range of the point cloud data, and performs a 3D filtering to filter out the plurality of data externally of the filter area.

In an embodiment, the electronic device 3 filters out the point data by setting values of the point data to be 0. The electronic device 3 takes the standard deviation as the radius of the filter range and performs a 3D filtering based on the following formula 4.

$$\text{Value}(d_i) = \begin{cases} \text{Value}(d_i) & \text{if } d_i < d_o - SD \text{ or } d_i > d_o + SD \\ 0 & \end{cases} \quad \text{(formula 4)}$$

where Value($d_i$) is point data.

Figure 9:
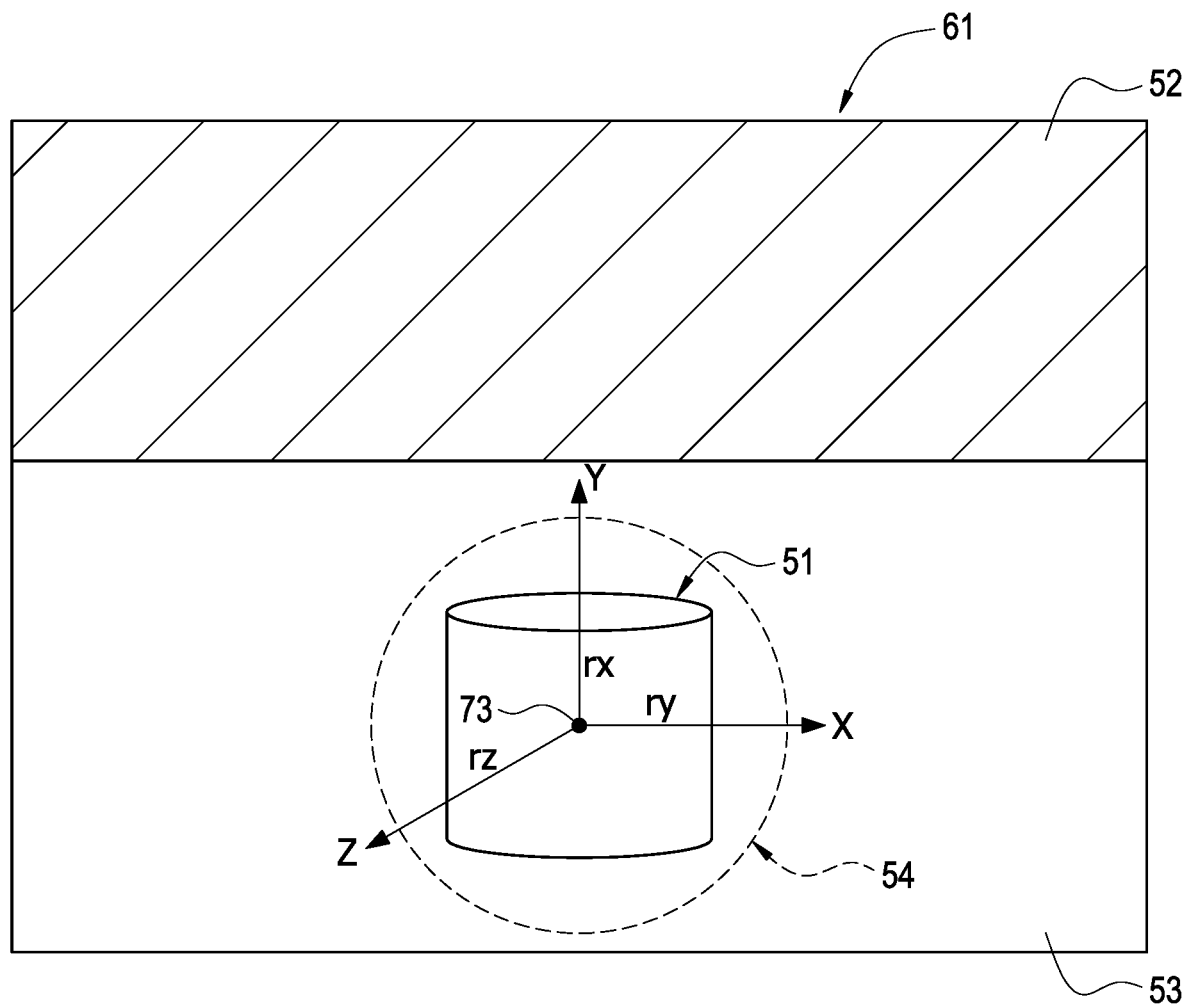
FIG. 9 schematically depicts point cloud data of the present disclosed example in a second configuration of the present disclosed example.
Figure 10:
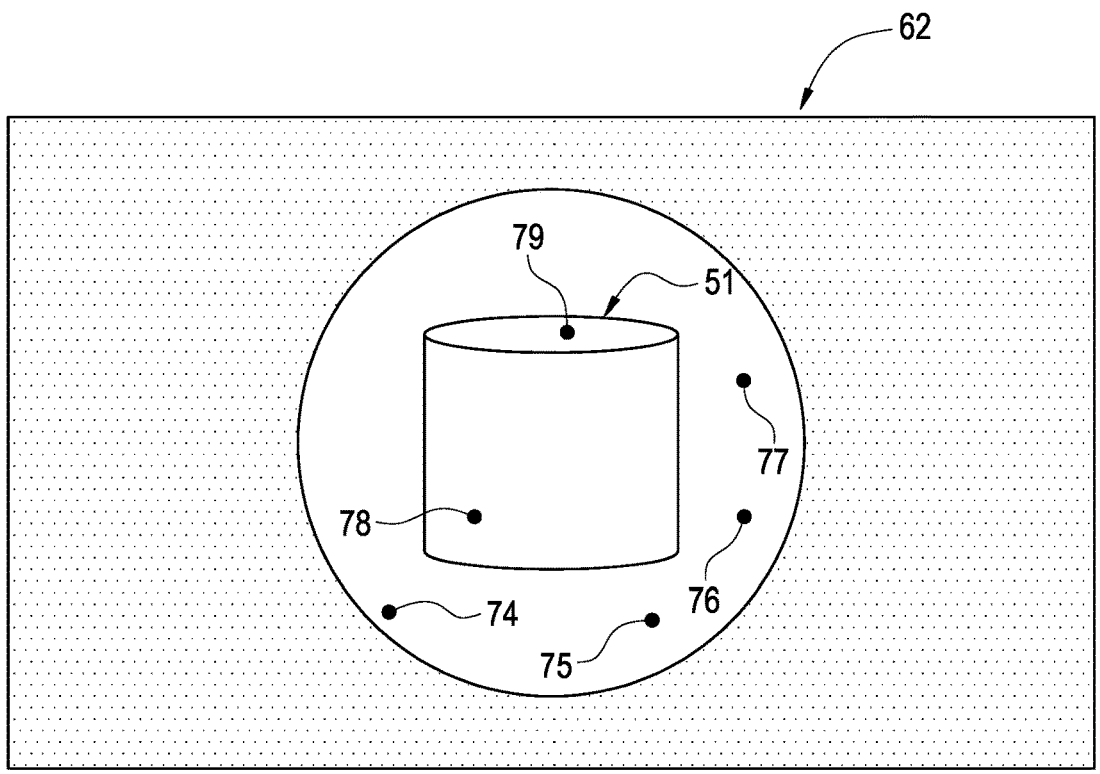
FIG. 10 schematically depicts point cloud data of the present disclosed example in a third configuration of the present disclosed example.

Referring to FIGS. 9 and 10 in which FIG. 9 schematically depicts point cloud data of the present disclosed example in a second configuration of the present disclosed example, FIG. 10 schematically depicts point cloud data of the present disclosed example in a third configuration of the present disclosed example, and both are used to describe how the present disclosed example performs a 3D filtering.

As shown in the point cloud data 61 of FIG. 9, the electronic device 3 takes standard deviations of three axes as radii rx, rx and rz of the three axes of the filter range in order to finish the setting of the filter range. Next, the electronic device 3 uses the filter range of the focus data 73 to set a filter area 54.

Next, the electronic device 3 filters out a plurality of point data externally of the filter area 54 to obtain a filtered point cloud data 62. As shown in FIG. 10, in the point cloud data 62 point data belonging to the target object 52 are kept, point data belonging to background are filtered out, and the number of point data belonging to the platform 53 is greatly decreased.

Thus, the present disclosed example can filter both point data belonging to background and point data belonging to the platform out of the point cloud data by performing a 3D filtering.

It is noted that the standard deviation may change in response to different ratios of sizes and depths of the target object in the image. Thus, the filter area of the present disclosed example may increase or decrease in response to the size and depth of the target object. Therefore, the 3D filtering of the present disclosed example is applicable to target object having different sizes and depths.

Figure 5:
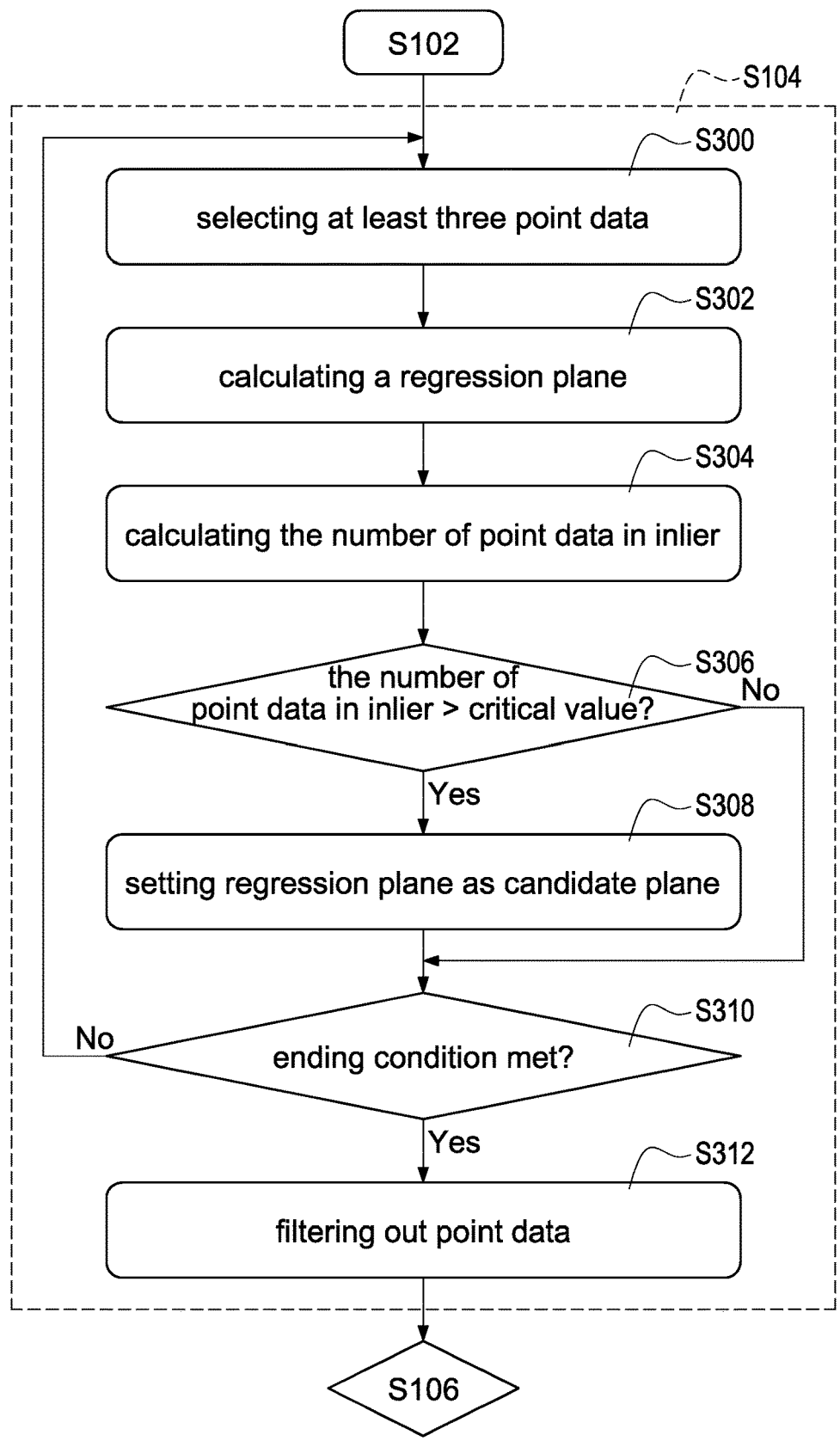
FIG. 5 is a flow chart illustrating details of step S104 according to a third embodiment of the 3D modeling method.
Figure 11:
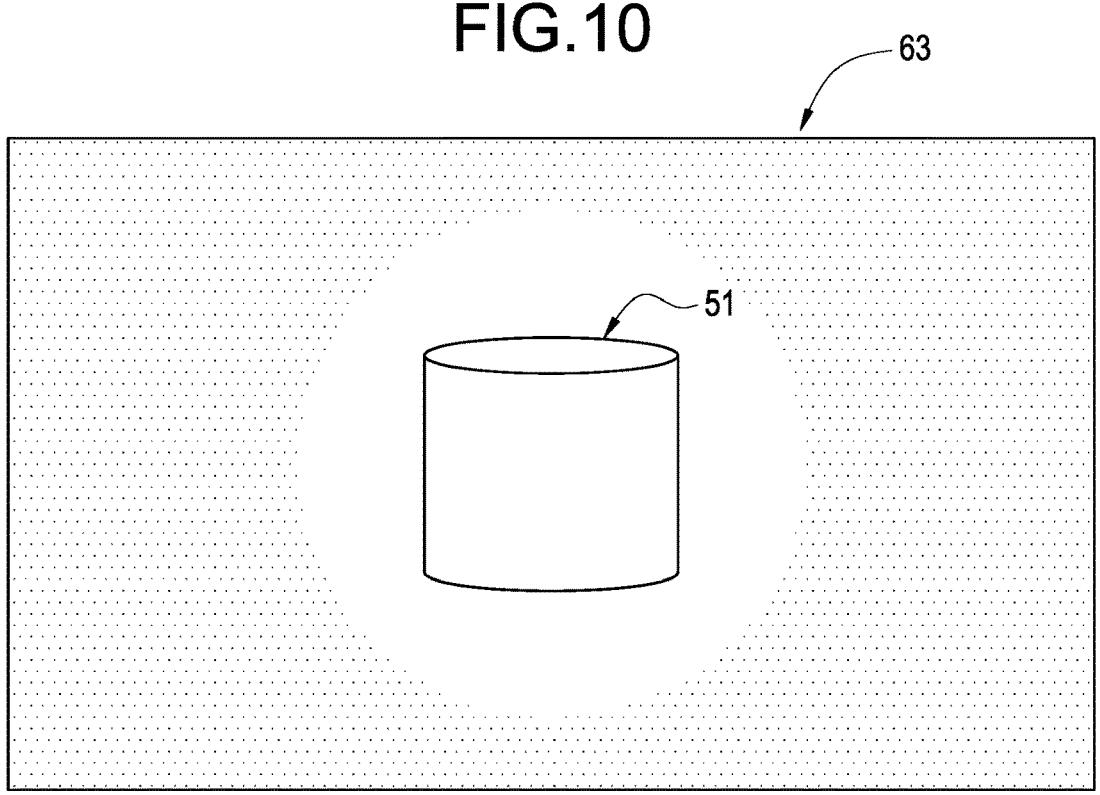
FIG. 11 schematically depicts point cloud data of the present disclosed example in a fourth configuration of the present disclosed example.

Referring to FIGS. 3, 5, 10 and 11 in which FIG. 5 is a flow chart illustrating details of step S104 according to a third embodiment of the 3D modeling method, and FIG. 11 schematically depicts point cloud data of the present disclosed example in a fourth configuration of the present disclosed example. In the embodiment, the pre-modeling process is a plane filtering process which filters out point data belonging to platform so that point data not belonging to the target object can be removed. In the embodiment, when the number of point data belonging to platform is greater than that of point data belonging to target object (i.e., area occupied by platform in the point cloud data greater than area occupied by target object), the plane filtering process of the embodiment has an improved filtering performance. In comparison with the 3D modeling method of FIG. 3, the step S104 according to the embodiment of the 3D modeling method comprises the following steps:

Step S300: The electronic device 3 selects at least three point data from a plurality of point data of the selected point cloud data.

In an embodiment, the electronic device 3 randomly selects three point data.

Step S302: The electronic device 3 determines a regression plane based on the selected at least three point data.

In an embodiment, the electronic device 3 calculates a set of regression functions based on coordinates of the selected at least three point data to determine a regression plane formed by the selected point data. The technique of calculating regression functions based on coordinates of the selected at least three point data to determine a regression plane is known in the art of algorithm. Thus, a detailed description thereof is omitted for the sake of brevity.

Step S304: The electronic device 3 determines whether the plurality of point data of the point cloud data belong to inlier or outlier of the calculated regression plane, and counts the number of the plurality of point data in the inlier if the plurality of point data of the point cloud data belong to inlier (i.e., the number of point data in the inlier).

In an embodiment, the electronic device 3 determines whether all point data of the point cloud data belong to inlier or outlier of the calculated regression plane.

In an embodiment, the electronic device 3 selects some point data of the point cloud data (e.g., randomly selected 80% of the point cloud data) and determines whether the selected plurality of point data belong to inlier or outlier of the calculated regression plane.

In an embodiment, the electronic device 3 gives coordinates of each point data to the calculated regression function and further determines that the point data belongs to the calculate regression plane (i.e., the point data in the inlier) if the result is complied with the expectation. Otherwise, the electronic device 3 determines that the point data does not belong to the calculate regression plane (i.e., the point data in the outlier).

In an embodiment, the electronic device 3 determines that the point data is in the inlier when an extension range is set at a periphery of the regression plane (i.e., at least one coefficient of the regression function changed from a fixed value to a range of value) and each point data belongs to the regression plane or its extension range. Further, the electronic device 3 determines that the point data is in the outlier when each point data does not belong to the regression plane or its extension range.

Further, the electronic device 3 obtains a predetermined critical value of error and then gives coordinates of each point data to the regression function for calculation. Furthermore, the electronic device 3 determines that the point data belongs to the inlier when the calculation result is not greater than the predetermined critical value of error.

Step S306: The electronic device 3 determines whether the number of point data of the inlier is greater than the predetermined critical value of the inlier or not.

In an embodiment, the electronic device 3 determines whether the number of point data of the inlier is greater than the predetermined critical value (e.g., 50% of the number of effective point data) of the inlier or not by comparison. The method proceeds to step S308 if the number of point data of the inlier is greater than the predetermined critical value. Otherwise, the method jumps to step S310.

In an embodiment, the electronic device 3 calculates a ratio of the number of point data of the inlier to the number of effective point data of the inlier. The method proceeds to step S308 if the ratio is greater than the predetermined critical value (e.g., 80% of the number of effective point data) of the inlier. Otherwise, the method jumps to step S310.

Step S308: The electronic device 3 records the calculated regression plane as a candidate plane. In an embodiment, the electronic device 3 does not record a regression plane having the number of effective point data of the inlier not greater than the predetermined critical value. Therefore, storage space can be saved.

Step S310: The electronic device 3 determines whether the ending condition has been met or not, i.e., determining whether calculating other regression planes should be stopped or not.

In an embodiment, the ending condition is whether the count of calculating the regression plane (e.g., the count of performing steps S300-S306) is equal to the critical count (e.g., 100) or the number of recorded candidate planes is equal to the critical number (e.g., 10).

The method proceeds to step S312 if the electronic device 3 determines that the ending condition has been met. Otherwise, the method loops back to step S300 and continues to perform steps S300-S308 in order to calculate another regression plane.

Step S312: The electronic device 3 selects one of a plurality of recorded candidate planes and filters a plurality of point data belonging to the selected candidate plane out of the point cloud data.

In an embodiment, the electronic device 3 calculates a distance between each candidate plane and the plurality of point data in an extension range of each candidate plane. Further, the electronic device 3 calculates a sum of the distances (i.e., total distance). The electronic device 3 selects a candidate plane having the minimum total distance. The electronic device 3 filters a plurality of point data belonging to the selected candidate plane and its extension range out of the point cloud data. Therefore, the present disclosed example can effectively filter out point data belonging to the platform.

In an embodiment, the electronic device 3 determines the number of point data of the inlier is greater than the predetermined critical value of the inlier (i.e., yes in step S306). Thereafter, steps S308-S310 are performed and directly filters out point data based on the current regression plane. By utilizing the present disclosed example, it is possible of greatly decreasing the number of operations of the electronic device 3, thereby greatly increasing the processing speed.

In an embodiment, the pre-modeling process comprises 3D filtering process and plane filtering process.

Specifically, as shown in point cloud data 62 of FIG. 10, after performing 3D filtering process on point data, the electronic device 3 performs plane filtering process. The electronic device 3 selects any three of the plurality of point data 74-79 and calculates a corresponding regression plane in the plane filtering process. For example, point data 74-76 are selected and a first regression plane corresponding to the selection is calculated, point data 74, 77 and 79 are selected and a second regression plane corresponding to the selection is calculated, and point data 77-79 are selected and a third regression plane corresponding to the selection is calculated. Next, the electronic device 3 determines that the first regression plane corresponds to the plane of the platform 53 (i.e., the number of point data of the inlier is greater than the predetermined critical value of the inlier), and filters out a plurality of point data based on the first regression plane (i.e., point data 74-77 of the platform 53 being filtered out). Therefore, as shown in FIG. 11, after the filtering the point data 63 only includes a plurality of point data belonging to the target object 51.

Figure 6:
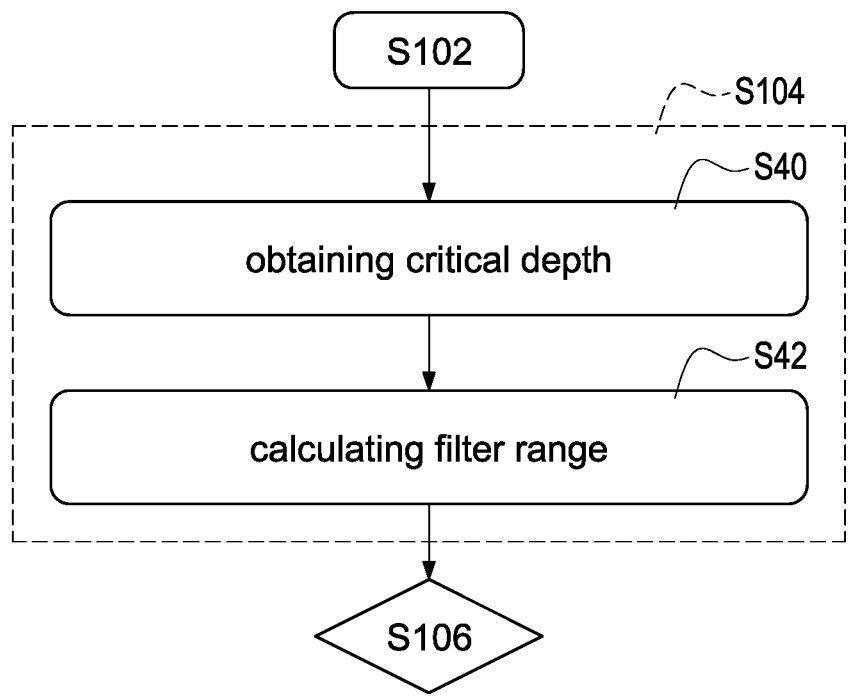
FIG. 6 is a flow chart illustrating details of step S104 according to a fourth embodiment of the 3D modeling method.
Figure 12:
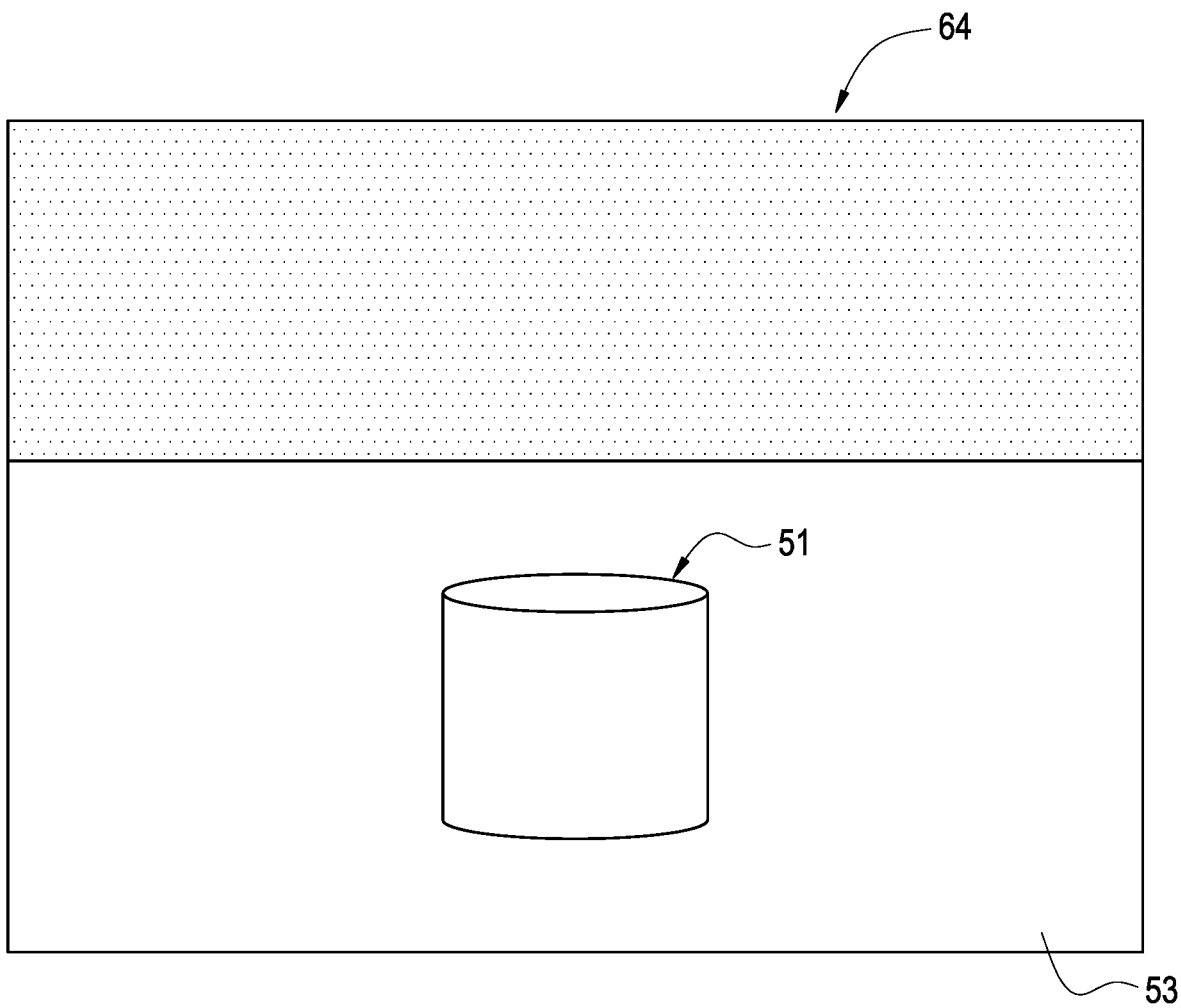
FIG. 12 schematically depicts point cloud data of the present disclosed example in a fifth configuration of the present disclosed example.

Referring to FIGS. 3, 6 and 12 in which FIG. 6 is a flow chart illustrating details of step S104 according to a fourth embodiment of the 3D modeling method, and FIG. 12 schematically depicts point cloud data of the present disclosed example in a fifth configuration of the present disclosed example. In the embodiment, the pre-modeling process is a background filtering process which is adapted to filter point data belonging to the background out of the point cloud data in order to remove point data not belonging to the target object. In comparison with the 3D modeling method of FIG. 3, the step S104 according to the embodiment of the 3D modeling method comprises the following steps:

Step S40: The electronic device 3 obtains a predetermined critical depth.

In an embodiment, the electronic device 3 analyzes values of depth of a plurality of point data of the point cloud data to determine a predetermined critical depth.

The analysis of the predetermined critical depth is known in the art and thus a detailed description is omitted herein for the sake of brevity.

Step S42: The electronic device 3 performs a filtering process on the plurality of point data of the point cloud data based on the predetermined critical depth.

Specifically, as shown in FIG. 8, the predetermined critical depth corresponds to the depth of the background 52 of the point cloud data 60. The electronic device 3 filters a plurality of point data having a depth not less than the predetermined critical depth out of the point cloud data 60. Thus, after the filtering the background 52 of the point cloud data 64 (see FIG. 10) is removed with only the target object 51 and the platform 53 left.

Figure 7:
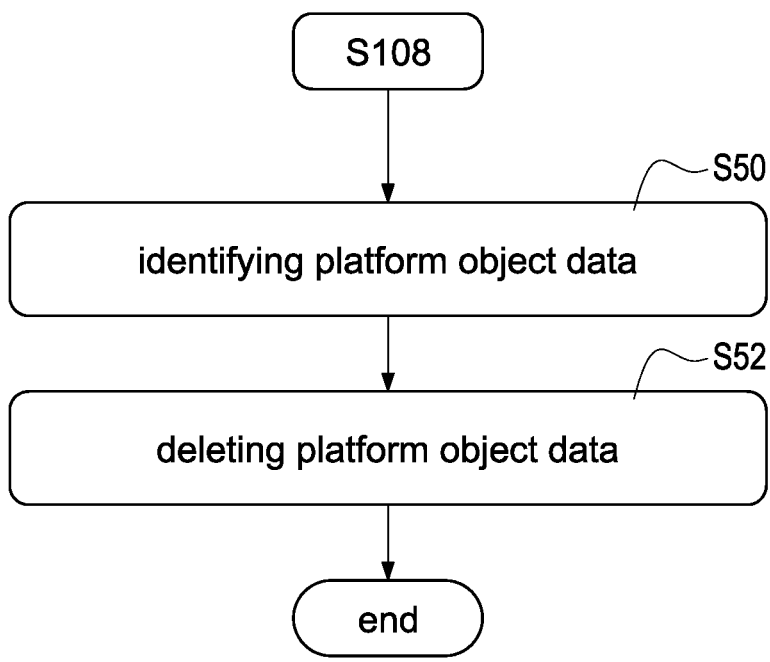
FIG. 7 is a flow chart illustrating steps after step S108 according to a fifth embodiment of the 3D modeling method.
Figure 13A:
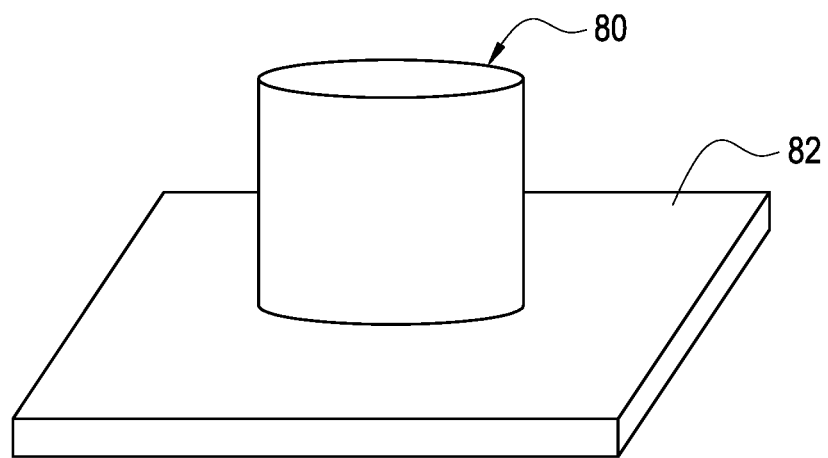
FIG. 13A schematically depicts 3D object data in a first configuration of the present disclosed example.
Figure 13B:
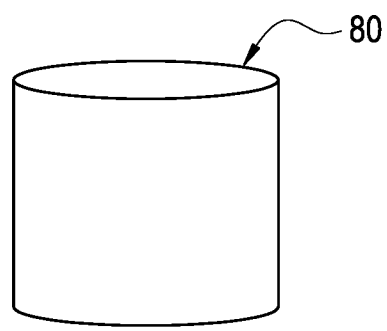
FIG. 13B schematically depicts 3D object data in a second configuration of the present disclosed example.

Referring to FIGS. 3, 7, 13A and 13B in which FIG. 7 is a flow chart illustrating steps after step S108 according to a fifth embodiment of the 3D modeling method, FIG. 13A schematically depicts 3D object data in a first configuration of the present disclosed example, and FIG. 13B schematically depicts 3D object data in a second configuration of the present disclosed example.

In the embodiment, a platform object removal is performed on a 3D object generated by the modeling process in order to remove a platform object out of the 3D object. In comparison with the 3D modeling method of FIG. 3, the step S108 according to the embodiment of the 3D modeling method comprises the following steps:

Step S40: The electronic device 3 identifies platform object data in the 3D object data corresponding to a platform object.

The method of identifying platform object data is known in the art and thus a detailed description is omitted herein for the sake of brevity.

Step S40: The identified platform object data is deleted from the 3D object data in order to remove the platform object out of the 3D object.

As shown in FIG. 13A, after the modeling process the 3D object includes a target object 80 and a platform object 82. The electronic device 3 can identify the platform object 82 in the 3D object and remove same. Thus, after the removal the 3D object only includes the target object 80 (see FIG. 13B).

The present disclosed example can effectively remove platform object data of the corresponding platform object out of the 3D object data so that the 3D object data does not have noise not belonging to the target object. As a result, a high quality 3D object data is generated.

Advantageously, the present disclosed example can effectively filter a plurality of point data belonging to background out of point cloud data.

It is noted that the electronic device 3 is adapted to perform at least one of the 3D filtering process, the plane filtering process, the background filtering process, and the platform object removal. For example, the electronic device 3 may perform the 3D filtering process and the plane filtering process; the 3D filtering process and the platform object removal; the background filtering process and the plane filtering process; the background filtering process, the 3D filtering process, and the plane filtering process; or the 3D filtering process, the plane filtering process, the background filtering process, and the platform object removal in a non-limiting manner.

While the present disclosed example has been described in terms of preferred embodiments, those skilled in the art will recognize that the present disclosed example can be practiced with modifications within the spirit and scope of the appended claims.

What is claimed is:

1. A 3D modeling method based on point cloud data for generating 3D object data corresponding to a target object (50, 51), comprising:
   (a) activating a 3D scanner (2) to obtain 2D images of the target object (50, 51) from different angles and a plurality of depths of the target object (50, 51), each depth corresponding to a plurality of pixels of the 2D images;
   (b) generating a plurality of point cloud data (60-64) based on the 2D images and the depths, each of the point cloud data (60-64) including a plurality of point data (70-79);
   (c) performing a pre-modeling process on the plural point cloud data (60-64) to filter the plural point data (70-79) not belonging to the target object (50, 51) out of each of the point cloud data (60-64); and
   (d) performing a 3D modeling process on the filtered point cloud data (60-64) to generate the 3D object data;
   wherein step (c) comprises the sub-steps of:
   (c11) selecting at least three point data (70-79) from each of the point cloud data (60-64);
   (c12) determining a regression plane based on the selected at least three point data (70-79);
   (c13) counting the number of the plural point data (70-79) belonging to the regression plane in the plural point cloud data (60-64) to obtain the number of the plural point data (70-79) in an inlier;
   (c14) setting the regression plane as one of a plurality of candidate planes when the number of the plural point data (70-79) of the inlier is greater than a critical value of the inlier;
   (c15) repeatedly performing steps (c11), (c12), (c13) and (c14) until an ending condition is met; and
   (c16) selecting one of the candidate planes and filtering the plural point data (70-79) belonging to the selected candidate plane out of each of the point cloud data (60-64) so as to filter the plural point data (70-79) belonging to a platform (53) out of each of the point cloud data (60-64).

2. The 3D modeling method as claimed in claim 1, wherein step (c) further comprises the sub-steps of:
   (c21) setting focus data in each of the point cloud data (60-64);

(c22) calculating a filter range based on coordinates of the plural point data (70-79) of each of the point cloud data (60-64) wherein the coordinates of each of the point data (70-79) are recorded with a plane location and a depth of each of the point data (70-79) in the plural point cloud data (60-64); and (c23) setting a filter area (54) in each of the point cloud data (60-64) based on the focus data and the filter range of each of the point cloud data (60-64), and filtering out the plural point data (70-79) externally of the filter area (54) so as to filter both the plural point data (70-79) belonging to a background (52) and the plural point data (70-79) belonging to the platform (53) out of each of the point cloud data (60-64).

3. The 3D modeling method as claimed in claim 2, wherein in sub-step (c21) the plural point data (70-79) in a center of the plural point cloud data (60-64) are set as the focus data.

4. The 3D modeling method as claimed in claim 2, wherein in sub-step (c21) an average of the coordinates of the plural point data (70-79) at a central area of the plural point cloud data (60-64) is calculated to obtain coordinates of the focus data.

5. The 3D modeling method as claimed in claim 2, wherein in sub-step (c22) a standard deviation between the coordinates of the plural point data (70-79) of each of the point cloud data (60-64) is calculated, and the filter range is set based on the standard deviation.

6. The 3D modeling method as claimed in claim 1, wherein in sub-step (c15) the ending condition is defined by repeatedly performing steps (c11), (c12), (c13) and (c14) a plurality of times and counting same until the count is equal to a predetermined count or the number of the candidate planes is equal to a predetermined number.

7. The 3D modeling method as claimed in claim 1, wherein in sub-step (c13) an extension range is set at a periphery of the regression plane, and the number of the plural point data (70-79) belonging to the regression plane or the extension range of the regression plane is calculated to obtain the number of the plural point data (70-79) of the inlier; and wherein in sub-step (c16) a distance between each candidate plane and the plural point data (70-79) in the extension range of each candidate plane is calculated, a plurality of the distance is calculated as a total distance, one of the candidate planes having a minimum total distance is selected, and the plural point data (70-79) belonging to the selected candidate plane and the extension range of the selected candidate plane are filtered out of each of the point cloud data (60-64).

8. The 3D modeling method as claimed in claim 1, wherein in sub-step (c12) a regression function is calculated based on the coordinates of the at least three point data (70-79) to determine the regression plane formed by the at least three point data (70-79), and wherein in sub-step (c13) the plural point data (70-79) belonging to the regression plane is determined when the coordinates of each of the plural point data (70-79) are complied with the regression function.

9. The 3D modeling method as claimed in claim 1, wherein step (c) further comprises the sub-steps of:
(c31) obtaining a critical depth; and
(c32) filtering the plural point data (70-79) having a depth not less than the critical depth out of each of the point cloud data (60-64) so as to filter the plural point data (70-79) belonging to the background (52) out of each of the point cloud data (60-64).

10. The 3D modeling method as claimed in claim 1, after step (d) further comprising the steps of:
(e1) identifying platform object data in the 3D object data corresponding to a platform object (82); and
(e2) deleting the platform object data from the 3D object data.

* * * * *